Aug. 4, 1942.  D. D. ROGERS  2,291,987
CUTTING APPARATUS
Filed Oct. 23, 1940  4 Sheets-Sheet 1
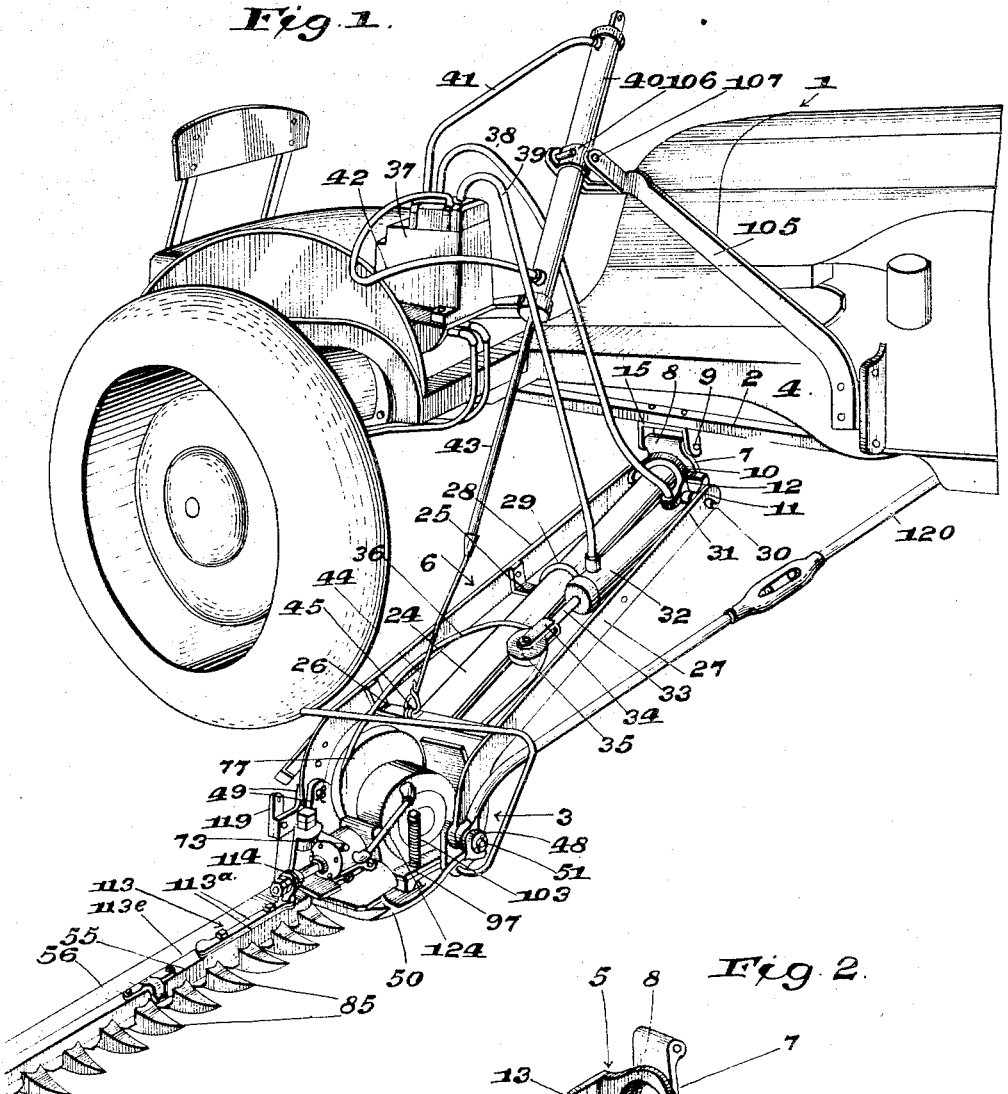
Inventor
Daniel D. Rogers

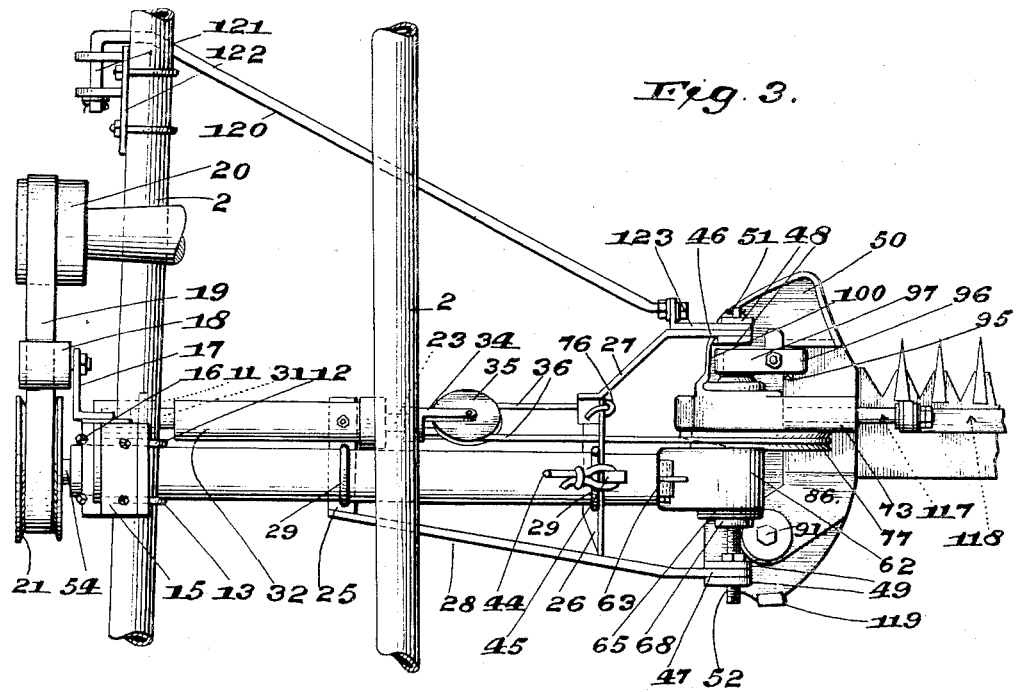
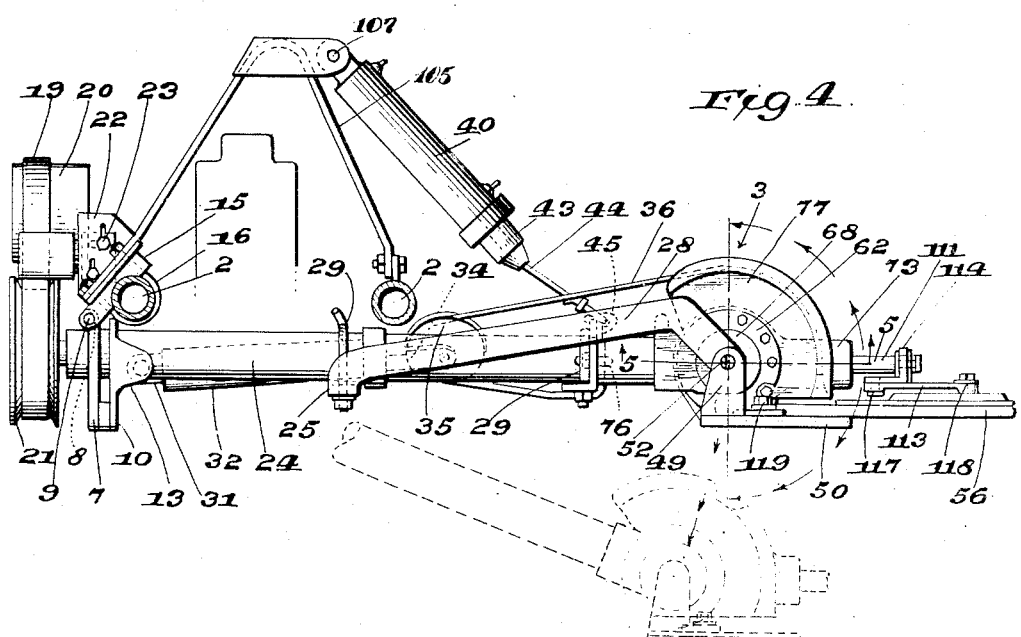

Aug. 4, 1942.        D. D. ROGERS        2,291,987
CUTTING APPARATUS
Filed Oct. 23, 1940        4 Sheets-Sheet 3

Inventor
Daniel D. Rogers
By
Munn, Anderson, & Liddy
Attorney

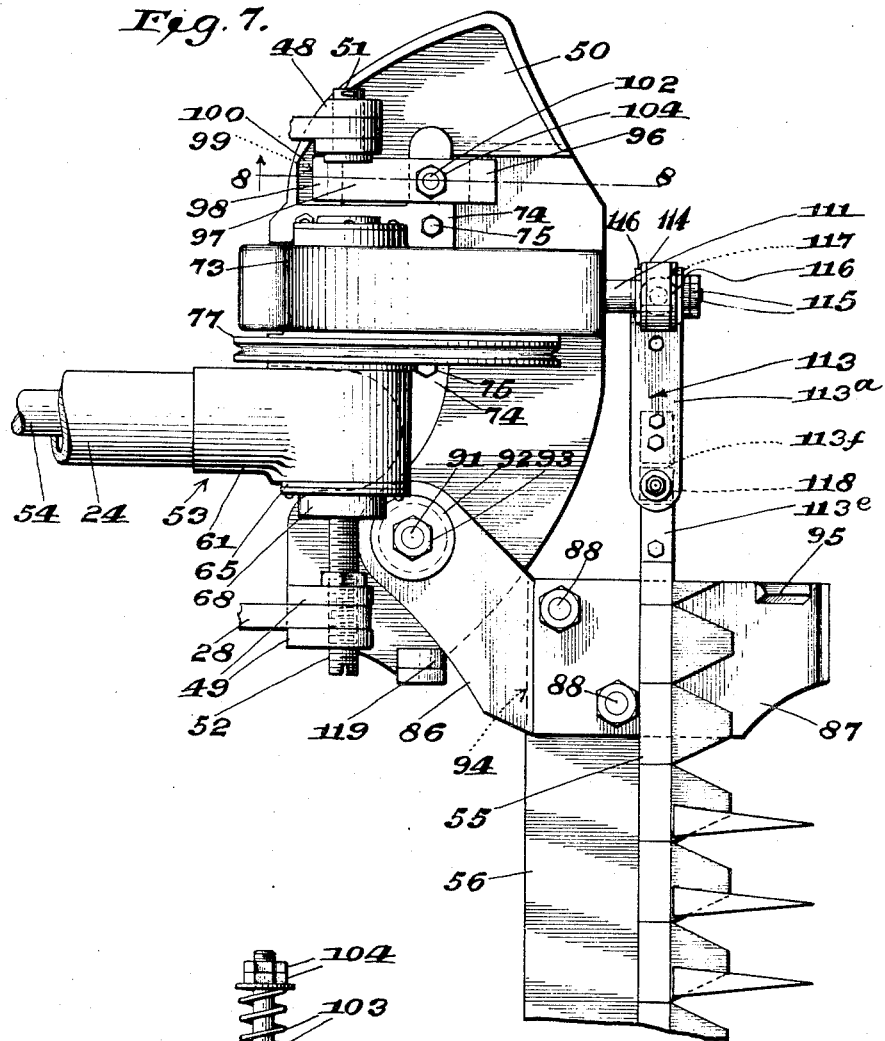
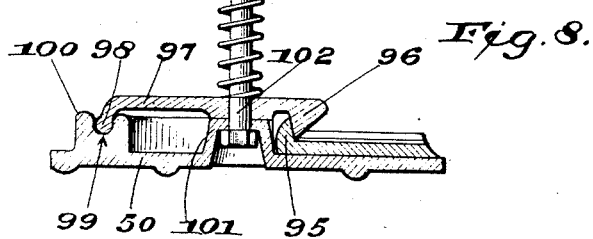

Patented Aug. 4, 1942

2,291,987

UNITED STATES PATENT OFFICE 2,291,987

CUTTING APPARATUS

Daniel D. Rogers, Columbia, S. C.

Application October 23, 1940, Serial No. 362,448

6 Claims. (Cl. 56—25)

This invention relates to improvements in cutting apparatus, and in its more specific aspects comprises a highway mower which is particularly adapted to the cutting of grass and the like along roadsides, in ditches and in fact on any ground surface regardless of its contour as encountered in any usual lay of the land.

In contriving an apparatus of the instant kind it is necessary, and obviously so, to embody numerous details of construction as a contribution toward a rugged piece of mechanism. While this consideration has been observed faithfully, the apparatus also embodies a number of principles which impart a novel aspect thereto. These principles are briefly summarized in the following statements of the objects of the invention which are:

First, to provide a cutting apparatus which is readily adaptable to a pitched ground surface such as is found along the side walls of ditches, as well as a level ground surface as along the sides of a road.

Second, to provide a cutting apparatus wherein the cutter bar is aptly described as being free floating inasmuch as its full weight rests on the ground surface from its point of attachment to the sliding shoe.

Third, to provide a cutting apparatus wherein the cutter bar is capable of cutting operation in any position within an approximately 180° vertical radius, and regardless of its particular setting is capable of being lifted over obstructions along the path of cutting so that no injury may befall any part of the mechanism.

Fourth, to provide a highway mower which includes an inner shoe or frame which can be raised from the ground and carried at any desired operating height while the outer end of the cutter bar can be released to float or follow the contour of the road shoulder or wall of a drainage ditch any where within the foregoing 180° radius.

Fifth, to provide a novel latch or hinge release which permits the cutter bar to break back 90° from its straight-out cutting position to a position parallel to the line of travel, said feature being of utmost importance in instances where hidden obstructions are encountered.

Other objects and advantages will appear in the following specification, reference being had to the accompanying drawings in which:

Figure 1 is a perspective view of the foregoing highway mower, illustrating its application to a known type of tractor.

Figure 2 is a perspective view of the coupling member by which the inner shoe or frame is swingably attached to the tractor chassis.

Figure 3 is a plan view mainly of the driving head and its driving connections, embodying modifications.

Figure 4 is a side elevation of the driving head structure in Fig. 3 but employing an inner shoe or frame as in Fig. 1.

Figure 7 is an enlarged plan view of the driving head, particularly illustrating the foregoing 90° break back action of the cutter bar.

Figure 8 is a cross section taken on the line 8—8 of Fig. 7.

Figure 9 is a section taken substantially on the line 9—9 of Fig. 7.

Figure 5:
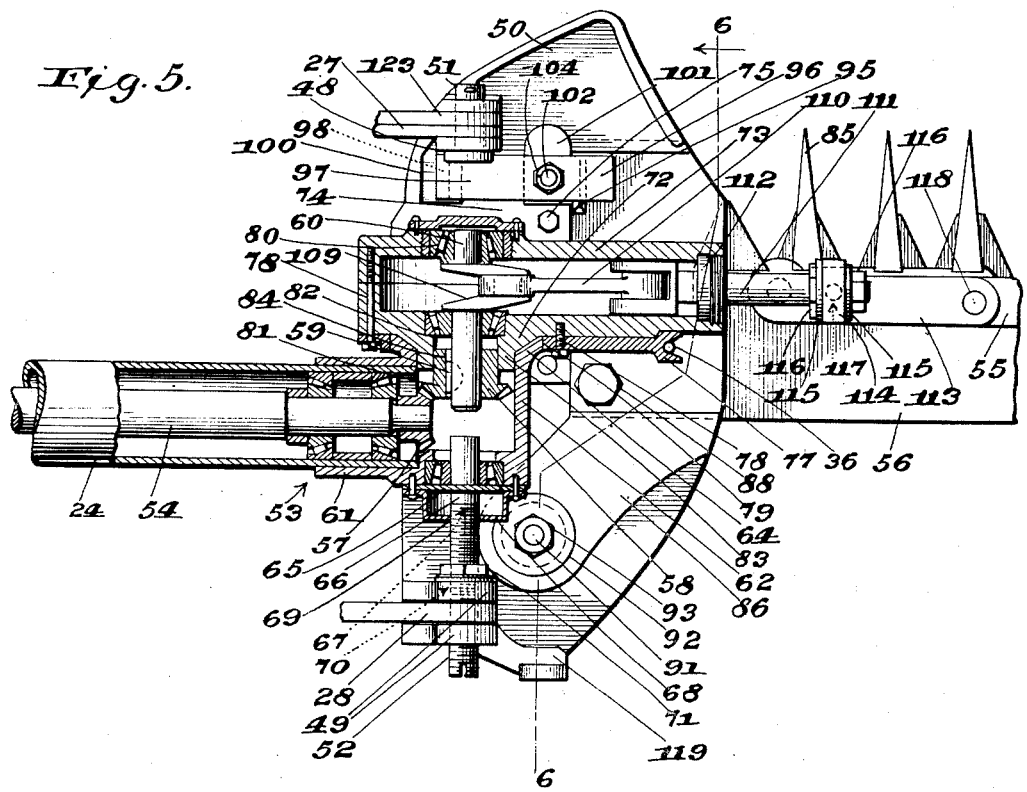
Figure 5 is a horizontal section taken on the line 5—5 of Fig. 4.

This invention is an improvement on the mower driving head of Daniel D. Rogers disclosed in an application for patent filed September 21, 1938, Serial No. 231,041, now Patent No. 2,214,777, granted September 17, 1940, but more directly an improvement on the cutting apparatus of Daniel D. Rogers disclosed in an application for patent filed September 7, 1939, Serial No. 293,835.

Use is herein made of a tractor generally designated 1, the details of which are of no concern to the invention with the exception that at least one of the chassis members 2 is used for the support of the cutting apparatus 3 (Fig. 1). It is intended that there shall not be any restriction as to which ones of the chassis members are employed. In fact both members are employed as in Fig. 4, whereas in Fig. 3 only one of them is employed while in Fig. 1 a part 4 of the structure on the chassis is employed in aiding in the support of the apparatus.

A coupling member 5 is used for the vertically hinging support of a contrivance 6 which was previously identified as the inner shoe or frame. The coupling member may take any one of a number of forms, a desirable construction being shown in Fig. 5 wherein said member consists of a plate 7. Said plate has a hinge knuckle 8 for a horizontal hinge pin 9 (Fig. 1). It also has a bracket plate 10 attached to the front of it, said plate having a pair of ears 11, 12 on one side and a single ear 13 on the other side. Both the plate 7 and the plate 10 have matching holes commonly designated 14. It is a matter of choice whether the plates 7 and 10 shall be made separate and then secured together or cast in one piece.

In either instance the hinge pin 9 connects the coupling member 5 to a support 15. In Fig. 1 this support comprises a bracket attached to the nether side of the chassis member 2. In Figs. 3 and 4 wherein the chassis members are of a tubular type the support 15 comprises a plate which is attached by means of a pair of U-bolts 16. In Figs. 3 and 4 incidental use is made of the support 16 as the carrier of a bracket 17 on which an idler 18 is revolubly mounted.

This idler comprises a tightener for a belt 19 which is applied to driver and driven pulleys 20, 21, the former deriving its power in any convenient way from the tractor motor. The bracket 17 is attached to a lug 22 (Fig. 4) upstanding from the support 16, by means of at least two bolts 23. Both the bracket 17 and lug 22 are suitably slotted to provide for the required adjustments in position of the idler 18.

It has been stated that the inner shoe 6 may take on a number of forms which will vary only in relatively minor details. That this can be proved is seen by comparing Fig. 1 with Figs. 3 and 4. In the former the tubular arm 24 which is an essential part of the inner shoe is rested respectively above and below a pair of cross members 25, 26, the ends of said members being riveted to hinge bars 27, 28, between which the tubular arm 24 is cradled.

The upper ends of said bars are secured to the ears 11, 13, of the coupling member 5, the tubular arm 24 being mounted in the common holes 14. The arm may simply be loosely emplaced in these holes, reliance being put on U bolts such as 29 for the securement of the tubular arm. These bolts are firmly connected to the cross members 25, 26. The pair of ears 11, 12 provide the support for a pin 30 on which the hinge end 31 of a hydraulic cutter bar hoisting cylinder 32 is swung for movement relative to and beside the tubular arm 24. The pin 30 goes through the bar 27 merely as a matter of convenience and incidentally aids in the attachment of said bar to the ear 11.

The cylinder 32 contains a piston (not shown), the rod 33 of which carries a fork 34 on its exposed end. A sheave 35 is journalled in this fork, and it carries the bight of a cable 36, the ends of which are presently accounted for. A hydraulic pump and valve mechanism, commonly designated 37, is mounted on the tractor in a position of convenient access to the driver. It is deemed unnecessary to go into the details of this mechanism, it being thought sufficient to state that by a proper operation of the respective valve the pressure fluid is made to flow in the conduits 38, 39, in such a way as to move the piston in the cylinder 32 in one direction or the other thus to draw in or let out the rod 33. The conduits 38, 39 are connected to the far ends of the cylinder 32.

While on the subject of the hydraulic mechanism reference is made to the driving head hoisting cylinder 40. This cylinder has conduit connections 41, 42 with the mechanism 37 for the purpose of actuating the contained piston (not shown), the exposed end of the rod 43 of which has secured to it one end of a short cable 44, the other end of which is attached to an eye 45 or its equivalent on the cross member 26.

So far it is readily understood that the regulation of the position of the piston in the cylinder 40 determines the altitude of the cutting apparatus 3 with respect to the tractor 1. The inner shoe 6 can be swung on the hinge pin 9 through a large angular distance, the swinging during a cutting operation manifestly being essential as when the driving head and cutter bar have to be raised above an obstruction such as a fire hydrant or tree stump.

Referring now to Figures 3 and 4 all parts identical with those just described in Fig. 1 are designated by corresponding reference numerals. The main structural difference occurs in the hinge bars 27, 28 and also in the cross member 26. The latter now comprises an angle iron with a hole of sufficient size in one of its webs to contain the tubular arm 24 (Fig. 4). A U bolt 29 is used as previously described to clamp the arm firmly at this point.

Instead of the bar 27 being extended back to the coupling member 5 it stops at the cross member 26 where it is secured in any chosen manner. Instead of the hinge bar 28 being extended back to the member 5 it stops at the cross member 25 with which it can be made integral. In both instances (Figs. 1 and 3, 4) the bars 27, 28 terminate in hinge ends 46, 47. The respective hinge ends are fitted between pairs of lugs 48, 49, upstanding from a shoe 50. The connection is made by pins 51, 52 which provide a hinge joint between the shoe 50 and its carried parts and the previously mentioned driving head which is now identified 53.

Said driving head comprises a simple gearing (Fig. 5) by which power is transmitted from a shaft 54 inside of the tubular arm 24 to the sickle bar 55 of the cutter bar 56. It is this shaft which carries the driven pulley 21 (Fig. 3). The gearing mentioned consists of a pair of bevel gears 57, 58 (Fig. 5), the first being rigid on the lower end of the shaft 54, the other being keyed at 59 to a crank shaft 60, the components of which are in axial alinement with the pins 51, 52.

The lower end of the tubular arm 24 is fixed in the sleeve 61 of the driving head housing 62 by means of a clamp arrangement 63 (Fig. 3). Said housing has a beveled annulus 64 at one of its extremities and an abutment plate 65 at the other extremity (Fig. 5). A ball 66 is rested against said plate, being held there because of its being contained by a concavity 67 in the inner end of the pin 52, said pin being long enough to provide for the bearing of the ball against the plate.

Figure 6:
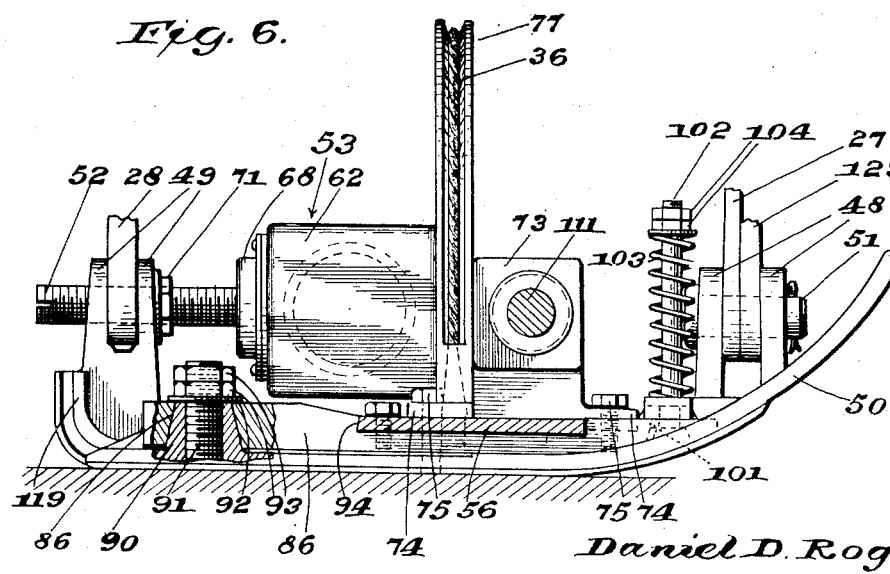
Figure 6 is a section taken on the line 6—6 of Fig. 5.

A cap 68 excludes dust and dirt from the ball, having a hole 69 to accommodate the near end of the pin 52 which, as seen in Fig. 5, is threaded a considerable portion of its length. It is screwed at 70 into the innermost one of the lugs 49 so as to be capable of adjustment with respect thereto. The adjustments are locked by a nut 71. The purpose of adjusting the pin 52 is to maintain a tight but working joint of the annulus 64 against a correspondingly beveled base 72 of the crank case 73. This crank case is rigidly affixed to the shoe 50 for which purpose it has flanges 74 (Fig. 6) which are fastened down by means of bolts 75.

Thus when it is desired to swing the cutting apparatus 3 with respect to the inner shoe 6 (Fig. 1) in order to stand the cutter bar 56 at the desired inclination, the turning occurs on the common axis consisting of the pins 51, 52, and the crank shaft 60 (Fig. 5), the entire shoe 50 and all of its immediately carried parts swinging on said axis in reference to the driving head 53 which, with the inner shoe 6 and tubular arm 24 remains stationary.

The turning is accomplished by action of the piston in the cylinder 32, the previously unaccounted for ends of the cable 36 respectively being anchored to the cross member 26 as at 76 (Fig. 3) and to the forward and lower end of a sheave quadrant 77. This quadrant is bolted at 78 (Fig. 5) to the crank case 73, one of the bolts thus designated serving to secure the halves of the crank case. There is a stepped joint 79 between the housing 62 and crank case 73 to minimize the entrance of foreign matter to the joint 64, 72.

A roller bearing 80 (Fig. 5) supports the short end of the crank shaft 60. Since the rollers are of the characteristic tapering formation it is possible to exercise some force on the crank shaft in the axial direction without displacing the rollers or unduly tightening the bearing. Said force occurs only when the necessity arises for adjusting the pin 52, and said adjustment is solely for the purpose of taking up eventual wear of the annulus 64 and its matching base 72. To this end the gear 58 has a fairly long hub 81 which revolves in the bore 82 of a sleeve portion 83 of the crank case 73. It is around this sleeve portion that the previously mentioned joint occurs.

The previously mentioned key is slidable in a slot 84 in the hub 81. Thus when looseness occurs in said joint, namely the annulus 64 and base 72, a turning of the screw pin 52 moves the driving head 53 over a very slight distance. Naturally the gear 57 pushes the gear 58 along the crank shaft 60 a slight distance, it being only the frictional component between the key 59 and its slot 84 that exercises the previously mentioned force against the crank shaft. It must be remembered that the crank case 73 is stationary as far as endwise movement is concerned, the joint adjustment being derived from the relative setting of the housing 62.

Considerable emphasis has been laid upon the break back action of the cutter bar 56 as when the guard 85 (Fig. 5) strikes an unseen obstruction. To allow this action use is made of a cutter bar mount 86 which, in its effect, is a hinge knuckle for the cutter bar. It comprises a substantial plate portion 87 to which the inner end of the cutter bar 56 is secured by a number of bolts 88. The mount 86 has an upwardly tapered hole 89 (Fig. 6) which is occupied by a correspondingly tapered hub 90 upstanding from the shoe 50. The purpose of the tapering is to maintain a constantly tight yet turnable bearing which insures against undesired looseness of the mount 86 and the prevention of its sagging in reference to the shoe.

A screw stud 91 (Fig. 6), driven into the hub 90 has a washer 92 mounted on it and a pair of lock nuts 93 screwed onto it to hold the washer down against the mount 86 so as to prevent its rising from the hub. The plate portion 87 is undercut at least at one place as at 94 (Fig. 6) to contain the beveled side portion of the cutter bar. That end of the mount 86 farthest from its hinge connection to the shoe 50 has a detent 95 which merely comprises an upstanding lug (Fig. 8).

This detent is held by the head 96 of a break back tie link 97. This link has an offset barrel portion 98 at its end opposite to the head 96. This is seated and turnable in the crotch 99 between a pair of protuberances 100 upstanding from the shoe 50. A hollow boss 101, also upstanding from the shoe (Fig. 8), accommodates the head of a bolt 102 which goes through the boss and through a hole in the tie link 97, extending up high enough to take a fairly long coil spring 103. This spring exercises its tension against the link, the tension being adjustable by nuts 104 on the threaded end of the bolt.

It can readily be understood that when the detent 95 is swung into engagement with the head 96 (Fig. 8) the cutter bar 56 will be maintained in its straight-out cutting position under all ordinary circumstances. Of course this presupposes the retention of the detent 95 by the head 96, but then the spring 103 is fairly heavy and thus insures the tie link 97 against rocking until an obstruction is encountered.

Reverting to Fig. 1 it is seen here that the hoisting cylinder 40 is mounted on the tractor 1 by means of a bracket 105 which is attached to the structure 4. Said bracket turnably supports the cylinder 40, for which purpose the latter has a collar 106 with trunnions 107 which turn in the forked end 108 of the bracket. The sickle bar 55 is actuated from the crank shaft 60 (Fig. 5) much on the order disclosed in the Rogers application 231,041, now Patent 2,214,777 of Sept. 17, 1940. Accordingly the crank 109 has a connecting rod 110 with a wrist pin connection to a shaft 111 which is reciprocable in a packing gland 112.

The coupling between the shaft 111 and the sickle bar 55 is made through the medium of a link 113 instead of directly to said sickle bar as in the patent. Said link actually comprises a two-part construction, the upper and lower parts 113a of which being bolted or otherwise secured together as shown. The ends of the link are socketed at 113b respectively for the occupancy of a ball 117 on the nether side of a head 114 and of a ball 118 which comprises the upstanding part of a forging 113e which is bolted onto the inner end of the knife or sickle bar 55. The parts 113a are originally provided with shoulders 113f adjacent to the sockets 113b so that these shoulders contact each other when the parts 113a are assembled. Later on when undue wear occurs between the balls and sockets, the parts 113a are disassembled and the shoulders 113f are filed off for proper adjustment. Eventually if and when the balls wear the original spacing of the parts 113a will be restored by shims inserted where the shoulders 113f formerly were.

Rubber abutments 115 are located between opposite sides of the head 114 and stop members 116 on the shaft 111. This particular feature is disclosed in an application for patent for rod joint or coupling filed by Daniel D. Rogers Sept. 14, 1940, Serial No. 356,877. But returning to the link 113, it is to be observed that this constitutes a hinge connection between the shaft 111 and the knife or sickle bar 55. The purpose of the connection is to permit the swinging of the cutter bar 56 (Fig. 7) with respect to the shaft when the break back action occurs. At that time the backward motion is limited by the engagement of the mount 86 with a stop 119 upstanding from the shoe.

A side brace 120 (Fig. 1) is desirable to use in most installations since it prevents undue strain on the hinge pin 9. The upper end of said brace is turnably connected at 121 (Fig. 3) to a bracket 122 on one of the members 2. The lower end of said brace is held by the pin 51, either directly as in Fig. 1 or through the medium of an angled extension 123 as in Fig. 3. In conclusion, use is made of a pipe 124 (Fig. 1) to place the gland 112 in communication with the interior of the crank case 73, thus to equalize the air pressure in the crank case and the space in back of the gland 112.

The operation is readily understood. Under ordinary circumstances the cutting apparatus assumes the position shown in Fig. 1. The driving head 53 is supported by setting the position of the piston inside of the cylinder 40. Ordinarily the adjustment is such that the shoe 50 just clears the ground surface. The holding pressure for the piston inside of the cylinder 32 is desirably relaxed so as to let the cutter bar 56 slide along the ground in floating relationship to the driving head and shoe.

In the event of the guard 85 striking a hidden obstruction there is an immediate break back action (Fig. 7) due to the release of the detent 95 from the tie link 97 (Fig. 8). Upon the occurrence of this action it is necessary for the driver to restore the cutter bar to its operating position by turning said bar forwardly until the detent 95 snaps under the head of the tie link. Adjustments for the altitude of the cutting apparatus 3 and for the inclination of the cutter bar 56 are obtained by manipulating the rods 43 and 33 of the respective cylinders 40, 32.

As an alternative to the suspension of the hoisting cylinder 40 as illustrated in Fig. 1 its support may be arranged as in Fig. 4. Here the trunnions 107 occur at the upper end of the cylinder which, in this instance, is shorter than the cylinder in Fig. 1. The bracket 105 is correspondingly modified in shape but the ultimate effect is to swingably support the hoisting cylinder.

Reference was made to the hinge action of the link 113 upon the occurrence of the break back action of the cutter bar 56 (Fig. 7). When this action occurs the link 113 partakes of a slight arcuate motion on the ball 118 as the center. The shaft 111 reciprocates rectilinearly, and since the link 113 is connected with it at the ball 117 it follows that there must be some accommodation for the resulting arcuate motion. This accommodation occurs by a slight and almost imperceptible vibration of the knife or sickle bar 55.

I claim:

1. In cutting apparatus, a ground shoe having an outwardly extended cutter and sickle bar assemblage, means for reciprocating the sickle bar including drive and crank shafts with intermeshed gears, a crank case affixed to the shoe, a drive head housing, said housing and case containing said means and having a joint therebetween, means turnably supporting the shoe in axial alinement with said crank shaft and joint, and means carried by the shoe, being part of the turnable carrying means and exercising pressure against said housing to maintain the tightness of said joint.

2. In cutting apparatus, a shoe having a cutter and sickle bar assemblage extending therefrom, drive means for actuating the sickle bar including a gear with a hub, a case affixed to the shoe containing a portion of the drive means which includes a crank shaft supporting the hub, a key carried by said shaft, slidably occupying a slot in the hub, a housing containing said gear and other portions of the drive mechanism, said housing and case having matching portions constituting a turnable joint between the housing and case, supporting means having hinge pin connections with the shoe situated on the axis of the crank shaft and joint so as to provide for said turning, and screw threads embodied in one of the pins, providing for adjustment with respect to the shoe and against a portion of the housing thus to maintain the tightness of the joint.

3. In cutting apparatus, a shoe having a laterally extended cutter and sickle bar assemblage, drive means for the sickle bar, a structure containing most of the drive means, said structure consisting of a case rigidly affixed to the shoe and having a sleeve portion with an internal bore and an external base, hinged supporting means for the shoe including pins axially alined with the sleeve, lugs on the shoe carrying the pins, one of the pins and its lug having a screw connection, a housing partly containing said sleeve portion and having an annulus confronting the base to make a joint, a crank shaft and gear hub included in said drive means and being centered in said sleeve, said shaft and hub having a slidable key connection, and a ball between the screw pin and a portion of the housing, exercising a pressure to maintain the joint, necessary adjustments of the screw pin being accommodated by limited sliding of the key connection.

4. Cutting apparatus comprising a coupling member swingably attachable to the chassis of a transporting vehicle, a tubular arm and frame bars in interconnected formation and supported by said coupling member, a shoe hingedly connected to said bars providing for the swinging of said shoe in respect to said formation, a cutter and sickle bar assemblage carried by the shoe, including drive means centered on the hinge connection to allow said assemblage to swing with the shoe, means to sustain said formation and shoe at chosen altitudes, and means carried by the coupling member in common with said arm and frame bars and having means connected with an encasement of said drive means to accomplish turning of the shoe on said hinge connection.

5. In cutting apparatus, a coupling member swingably attachable to the chassis of a transporting vehicle, said member including one pair of lugs and a single lug, a tubular arm extending from the coupling member and carrying a driving head, a shoe having a housing turnably joined with said head and provided with a sheave quadrant, a hinge connection embodied in the shoe in line with the axis of turning of said head and housing, hinge bars fixed in reference to the tubular arm, at least one of the bars being secured to the single lug, and a hoisting cylinder mounted between the pair of lugs, said cylinder embodying movable means with a cable connection to the sheave quadrant.

6. In cutting apparatus, a coupling member swingably attachable to the chassis of a transporting vehicle, a tubular arm extending from the coupling member and carrying a driving head, a shoe having a housing turnably joined with said head and provided with a sheave quadrant, a hinge connection embodied in the shoe in line with the axis of turning of said head and housing, hinge bars having one of their terminals embodied in the hinge connection, cross members affixed to the tubular arm and having the other terminals of said hinge bars affixed thereto, hoisting means mounted on the coupling member and embodying movable means with a cable connection to the sheave quadrant for swinging the coupling member, and brace means having one of its ends embodied in the hinge connection, and having bracket means at its other end attachable to the chassis for swinging with the coupling member.

DANIEL D. ROGERS.